(No Model.)
S. T. WILLIAMS.
WHEEL.
No. 300,293. Patented June 10, 1884.
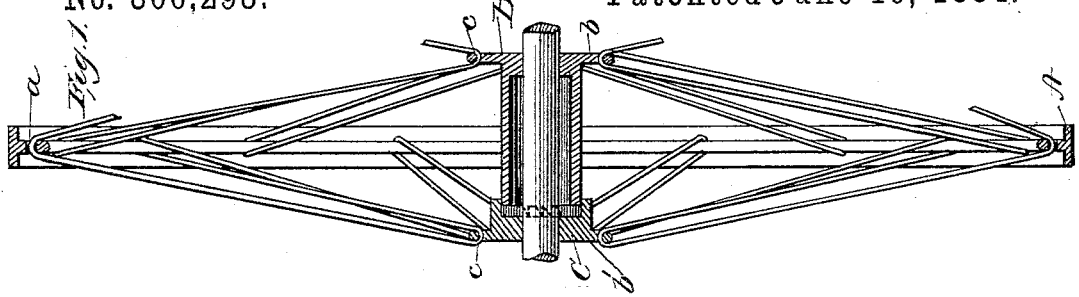
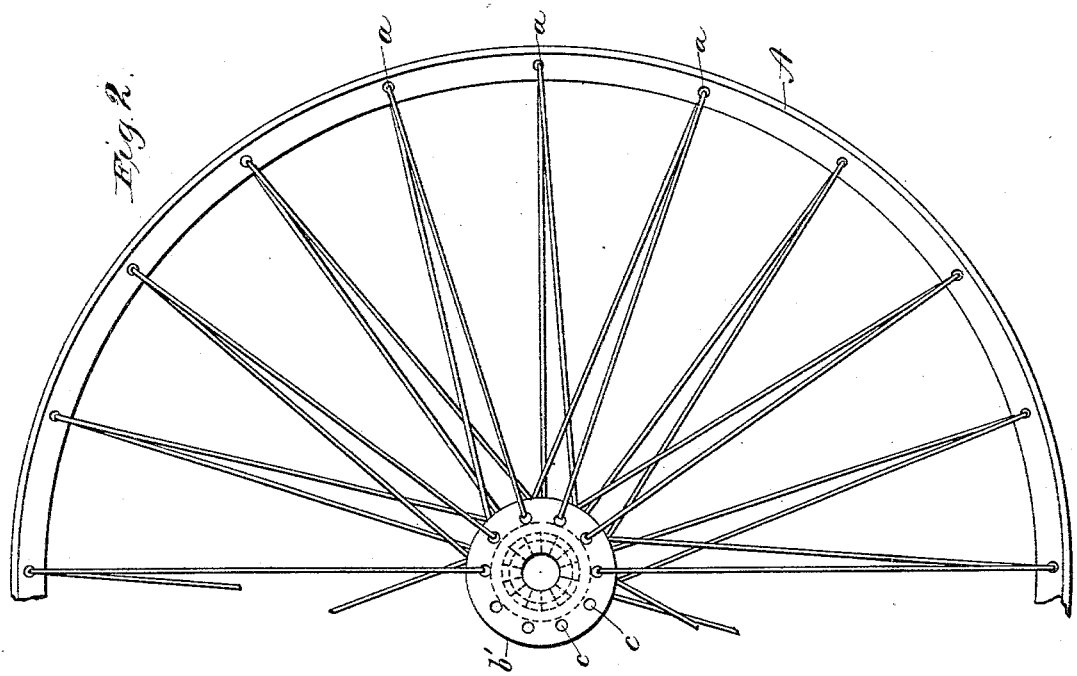
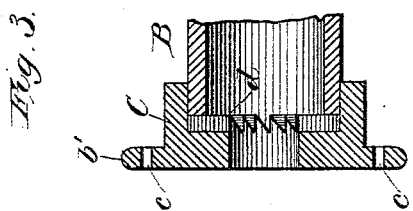
Witnesses:
F. L. Durand
E. A. Finckel.
Inventor:
Sam'l T. Williams
by his Attorney
Ernest Cedros

UNITED STATES PATENT OFFICE.

SAMUEL T. WILLIAMS, OF RED BANK, NEW JERSEY.

WHEEL.

SPECIFICATION forming part of Letters Patent No. 300,293, dated June 10, 1884.

Application filed October 4, 1883. (No model.)

*To all whom it may concern:*

Be it known that I, SAMUEL T. WILLIAMS, a citizen of the United States, residing at Red Bank, in the county of Monmouth and State of New Jersey, have invented certain new and useful Improvements in Wheels, of which the following is a full, clear, and exact description.

This invention relates to that class of vehicle-wheels which are made entirely, or nearly so, of metal, such as are usually employed in velocipedes, tricycles, and the like; and the invention consists in a novel construction of hub, by which all the spokes may be tightened or loosened at pleasure, and by but a partial rotation of one end of the hub.

In the accompanying drawings, in which similar letters of reference indicate like parts, Figure 1 is a sectional view of a wheel embodying my invention. Fig. 2 is a side elevation of my wheel, a portion being broken away. Fig. 3 is a section, on an enlarged scale, of a portion of the hub, illustrating that end of the hub by which the spokes are tightened and loosened.

The letter A designates the combined tire and felly, which are preferably made integral and of one piece of metal having a T shape in cross-section, and this constitutes the outer rim or periphery of the wheel. The felly is provided with a series of holes, $a$, through which the wire forming the spokes is passed.

B represents the body of the hub, which may be bored or cored out to receive the usual axle. One end of this hub B is provided with a flange, $b$, cast integral with the body of the hub. The other end of the hub is provided with a series of teeth radial with relation to the axis of the hub. These teeth engage corresponding teeth, $d$, in the cap C, which latter fits and is adapted to be turned on the end of said hub B. The cap C is also cored out, so as to correspond with the hole provided in the portion B, to receive the usual axle, and is also provided on its outer end with a flange, $b'$, similar to that on the outer end of portion B. These flanges $b$ $b'$ are provided with holes $c$, through which the wire forming the spokes is passed. The spoking of the wheel is preferably done in the following manner: A single piece of wire or strip of metal is run through one of the holes $a$ in the felly, and then through a hole, $c$, in the flange $b$, then through the next hole but one in the felly, then through the next hole in the flange, and so on, using alternate holes in the felly and successive holes on the side of the hub begun with until every hole is used. Alternate holes are left in the felly for stringing holes in the flange $b'$ of the cap C at the other end of the hub until the ends of the strip or wire meet, when they may be united in any suitable manner.

The spokes are tightened as follows: With a wrench or other tool the cap C with teeth, as illustrated in the drawings, should be turned to the left, and if turned sufficiently the spokes will become distended and tight, and the teeth $d$ will engage the corresponding teeth on the end of portion B, and act as a clutch to lock and hold the portion B and cap C together, thus retaining the spokes in their tight condition. They may be loosened, when desired, by forcibly lifting the cap-plate C from the end of the main portion B of the hub.

What I claim is—

A hub for wheels of the class described, composed of the main portion B, having the flange $b$ on one end thereof, and rigid or immovable thereon, and radial teeth on the other end, and cap C, having the flange $b'$ and teeth $d$ thereon to engage the teeth on the end of the said portion B, all constructed and arranged substantially as set forth, whereby the spokes may be distended and held in their distended condition, as specified.

In testimony whereof I have hereunto set my hand this 1st day of October, A. D. 1883.

SAMUEL T. WILLIAMS.

Witnesses:
ERNEST C. WEBB,
ARTHUR C. WEBB.